United States Patent

Saunders, III

[11] Patent Number: 5,918,707
[45] Date of Patent: Jul. 6, 1999

[54] METHOD AND APPARATUS FOR CORRECTING BRAKE ROTOR RUNOUT

[75] Inventor: Thomas N. Saunders, III, Glen Allen, Va.

[73] Assignee: Accu Systems, Inc., Ashland, Va.

[21] Appl. No.: 08/792,939

[22] Filed: Jan. 24, 1997

[51] Int. Cl.[6] ............................... B60B 3/14; B60T 1/06; F16D 65/14

[52] U.S. Cl. ....................... 188/18 A; 188/206 R; 188/218 R; 301/6.1; 411/535; 411/537; 280/661

[58] Field of Search ................. 188/18 A, 73.1, 188/205 R, 206 R, 218 R; 180/253; 301/6.1, 6.2, 9.2; 403/1, 4, 98; 411/535, 537, 538, 539, 546; 280/661

[56] References Cited

U.S. PATENT DOCUMENTS

| | | | |
|---|---|---|---|
| D. 272,392 | 1/1984 | Bigelow | D8/354 |
| 3,663,045 | 5/1972 | Mitchell | 411/537 |
| 4,037,680 | 7/1977 | Grove | 180/43 |
| 4,195,862 | 4/1980 | Specktor et al. | 280/661 |
| 4,226,146 | 10/1980 | Ekman | 82/4 |
| 4,388,846 | 6/1983 | Kopecko et al. | 82/4 |
| 4,400,007 | 8/1983 | Ingalls | 280/661 |
| 4,526,641 | 7/1985 | Schriever | 156/247 |
| 4,684,150 | 8/1987 | Specktor et al. | 280/661 |
| 4,854,199 | 8/1989 | Norman | 82/112 |
| 4,867,472 | 9/1989 | Ward | 280/661 |
| 4,872,699 | 10/1989 | Grove et al. | 280/661 |
| 5,074,578 | 12/1991 | Grove et al. | 280/661 |
| 5,098,117 | 3/1992 | Specktor et al. | 280/661 |
| 5,108,156 | 4/1992 | Bell | 301/6 R |
| 5,265,486 | 11/1993 | Hartman et al. | 74/416 |
| 5,279,192 | 1/1994 | Hartman | 82/112 |
| 5,383,678 | 1/1995 | Sokol | 280/661 |
| 5,499,563 | 3/1996 | Hansen | 82/112 |
| 5,549,023 | 8/1996 | Strout et al. | 82/112 |

Primary Examiner—Chris Schwartz
Attorney, Agent, or Firm—James L. Ewing, IV; Kilpatrick Stockton LLP

[57] ABSTRACT

A tape correction plate and method of using the correction plate to correct for lateral runout of a disc brake rotor is described. The tapered correction plate is installed between the hub and brake rotor of an automobile such that the thinnest portion of the correction plate is aligned with the angular position on the hub and rotor corresponding to the maximum lateral runout. The mounting geometry of the correction plate may include any one of a number of configurations including circular openings, slotted openings having a smooth or gear-like perimeter, or an outer perimeter defining a gear like shape or open-ended "half slots." Each type of mounting geometry is suitable for mating with existing lug patterns while enabling adjustment of the angular orientation of the correction plate with respect to the hub and rotor. The correction plate may also consist of one washer or a number of washers with appropriately varying thicknesses that are arranged to correct runout.

26 Claims, 7 Drawing Sheets

METHOD AND APPARATUS FOR CORRECTING BRAKE ROTOR RUNOUT

This invention relates to a method and apparatus for use in correcting misalignment between a hub and disc brake rotor of the sort that creates a condition known as lateral runout. More particularly the invention relates to a tapered correction plate and method of installing the correction plate between the hub and rotor to compensate for the lateral runout of the rotor.

BACKGROUND OF THE INVENTION

Virtually all modem passenger automobiles and most modern trucks employ disc brake systems on at least the front wheels. When the driver depresses the brake pedal, a hydraulic system forces brake pads against each side of a disc-shaped, metallic brake rotor. This rotor is attached to the automobile at the hub, which is connected to the suspension system. The respective axes around which the hub and rotor rotate must be precisely perpendicular to their respective mating surfaces and also aligned with each other in order to maximize the efficiency and life of the braking system. If the axis of rotation of the hub and the axis of rotation of the rotor are not precisely aligned with each other or are not precisely perpendicular to their respective mating surfaces, then the surface of the rotor will oscillate laterally as the rotor turns and cause the pressure between the rotor and the brake pads to vary, sometimes dramatically. Drivers sometimes, in certain vehicles, sense the runout in the form of a pulsating brake pedal. Because the braking system is a discrete subsystem within the overall wheel assembly, misalignment within the braking system as described above cannot be corrected using conventional devices for correcting misalignment in other portions of the wheel assembly (e.g., devices for correcting camber).

Such misalignment is caused by any combination of factors including: inaccuracy in hub geometry, imperfections in the hub and rotor mounting surfaces, inaccuracy in the bearings that are mounted in the hub mating surfaces, inaccuracy in rotor geometry, improper surface finishing of the rotor or the hub, and worn or inaccurate refinishing equipment (e.g., bench lathes). More important than causing an anomalous sensation in the brake pedal, however, this misalignment reduces braking efficiency and accelerates the rate at which the surfaces of the rotor and the brake pads wear. The misalignment also causes uneven heating in the rotor that leads to uneven wear and warping of the rotor. Excessive warping of the rotor exacerbates the pulsing problem sensed through the brake pedal and requires that the brake technician remove an excessive amount of material from the rotor when resurfacing it.

Brake technicians typically measure such misalignment using special tools. For example, they may rotate the rotor in the presence of a stationary stylus that is attached to a micrometer and which follows the rotor surface. The micrometer records the maximum lateral deflection of the brake rotor as the rotor rotates. This maximum lateral deflection is known as "runout" and is expressed as a linear dimension. Most manufacturers specify that runout for a late model automobile should be no more than approximately 0.002–0.003 inches, but often, runout of as much as 0.012 inches is encountered by brake technicians.

Conventional methods of correcting rotor runout employ a lathe to resurface a brake rotor by removing a very thin layer from the outer surface of the rotor. Typically, rotors are resurfaced using a bench lathe, which requires that the rotor be removed from the hub before resurfacing, or a portable lathe mounted directly to the rotor while it remains attached to the hub and the automobile. Bench lathes currently are the best tool for creating a superior surface finish on a brake rotor. However, bench lathes sometimes fail to compensate fully for many causes of runout, which are only evident when the rotor is mounted to the hub. By contrast, an on-the-car lathe is sometimes effective at correcting runout, but it often must remove an inordinate amount of material from the rotor to do so. However, typical on-the-car lathes do not finish the surface of the rotor as well as a bench lathe.

In order to ensure that the brake rotors are able to dissipate the heat generated by braking, manufacturers currently specify that a total of no more than approximately 0.030 to 0.070 inches of material may be removed from the surface of the brake rotor. If too much material must be removed for an on-the-car lathe to correct the runout measured by a technician, then the rotor must be replaced. Thus, methods employing on-the-car lathes can "waste" rotor material and can significantly shorten the life of the rotor. For example, when correcting for 0.006 inches of runout, a brake technician must adjust an on-the-car lathe to remove at least 0.006 inches per side of the rotor. Thus, at least 0.012 inches of material must be removed, which is a significant fraction of the total amount of material that can ever be removed from the rotor. Such excessive removal of material drastically reduces the overall life of the rotor and decreases the ability of the rotor to dissipate heat, which may accelerate the rate at which the rotor warps and thus shorten the time between required rotor servicing.

Another conventional method of correcting rotor runout is described in U.S. Pat. No. 5,108,156 ("the '156 patent"), which is incorporated into this document in its entirety by this reference. The '156 patent describes a set of relatively thick washers of a single thickness held in a fixed circumferential relationship by a thinner ring-shaped body (also of uniform thickness). According to the '156 patent, its ring-and-washer set is interposed between the hub and rotor and purportedly corrects runout by accommodating "surface imperfections, including dirt and rust particles between the hub . . . in a space defined by the washers."Additionally, the shim corrects runout by "minimiz[ing] the surface area of contact between the hub and rotor."

However, the ring-and-washer set disclosed in the '156 patent cannot correct for: any misalignment between the respective axes of rotation of the hub and rotor, a lack of a perpendicular relationship between the axis of rotation and the mating surfaces of the hub and rotor, or surface imperfections in hub and rotor that lie under the washers near the lugs. Moreover, significantly reducing the contact area between the hub and rotor may cause long term wear of the hub and rotor due to localized stress concentration where the washers rest upon the hub and rotor. Because of the problems associated with existing hardware and methods for correcting brake rotor runout, a need continues to exist for an efficient, inexpensive, and effective method of correcting brake rotor runout.

SUMMARY OF THE INVENTION

The present invention accurately and inexpensively solves the problem of rotor runout without using on-the-car lathing or the ring-and-washer set described in the '156 patent. The present invention allows a brake technician to resurface a rotor using a bench lathe, which is able to resurface a rotor with a much higher quality surface finish than an on-the-car lathe, and remove only that material from the surface of the rotor required to reestablish a high quality surface finish. The present invention avoids the disadvantages of using an on-the-car lathe, which is expensive to purchase and maintain, time consuming to use, subject to operator error, and exhibits poor surface finish and other machining characteristics. The present invention also more accurately corrects for runout and can compensate for more types of causes of runout than use of the shim described in the '156 patent. Thus, the use of the present invention allows a brake technician to maximize the performance of the braking system while simultaneously maximizing the life of the rotor.

Methods according to the present invention compensate for any misalignment between the hub and rotor by interposing an appropriately tapered correction plate between the hub and rotor. A correction plate according to the present invention is installed by determining the angular position on the rotor and hub corresponding to the maximum lateral runout; measuring the maximum lateral runout; removing the brake rotor from the hub; choosing one or more appropriately tapered correction plates to compensate for the maximum lateral runout; mounting the correction plate(s) on the hub with their point of minimum thickness located adjacent the position on the hub at which maximum lateral runout was observed; and remounting the brake rotor to the hub in the same orientation in which the rotor was previously mounted.

Correction plates of the present invention are preferably ring-shaped discs with a centrally located hole for accommodating the collar of the hub and circumferentially spaced openings that correspond to the existing lug pattern. The circumferentially spaced openings in the correction plate are preferably circular holes but may be slots to allow a plate to be precisely oriented on the hub before the rotor is reinstalled. Alternatively, the mating positions on the correction plate may be indentations along the outer perimeter of the plate or within the slots, which could allow for some adjustment of the angular orientation of the correction plate relative to the hub and rotor, but with the positive angular positioning exhibited by a plate with circular openings. Plates according to the present invention can also take the form of a tapered arcuate "partial ring" that is installed approximately 180° from the angular position on the hub and rotor exhibiting maximum runout. A correction plate according to the present invention may also consist of one washer or at least two washers of declining thicknesses that are arranged appropriately between the hub and rotor. Of course, other types of plates may fall within the scope of the present invention to allow a structure that functions to align the rotor and the hub with the result of inexpensive, efficient, and effective alignment. Correction plates according to the present invention may be made of metal, sufficiently durable plastic, or any other material having suitable wear, hardness, toughness, and dimensionally stability.

It is accordingly an object of the present invention to provide tapered correction plates and a method of installing the correction plates between a hub and disc brake rotor that accurately, quickly, simply, and inexpensively compensates for all possible causes of brake rotor runout.

It is a still further object of the present invention to provide tapered correction plates that may be installed in any angular orientation with respect to the hub and rotor in order to enable precise correction of runout.

Other objects, features and advantages of the present invention will become apparent with reference to the remainder of this document.

DETAILED DESCRIPTION OF THE INVENTION

Figure 1:
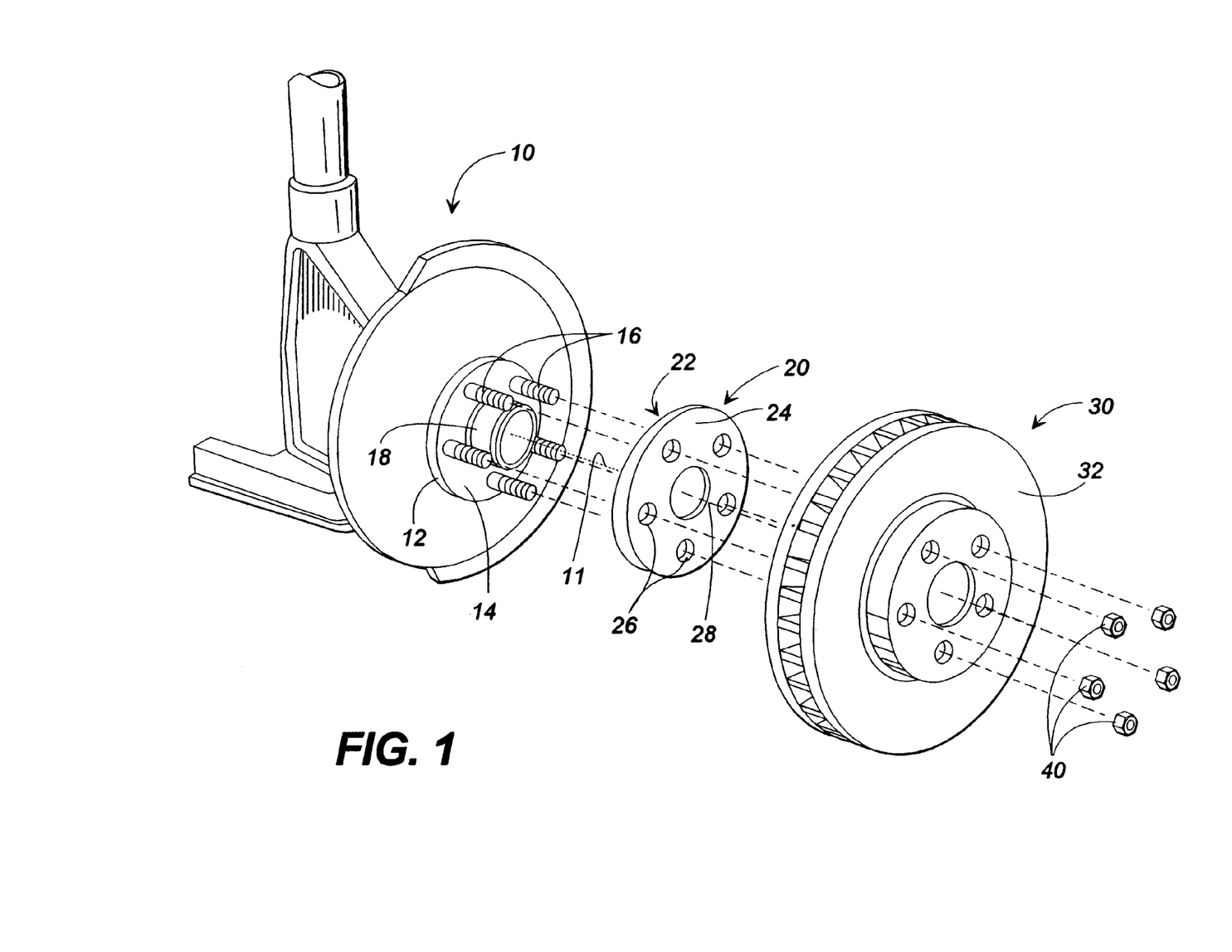
FIG. 1 is an exploded perspective view of a representative hub and rotor assembly in which a correction plate according to the present invention is shown interposed between the hub and rotor.
Figure 2:
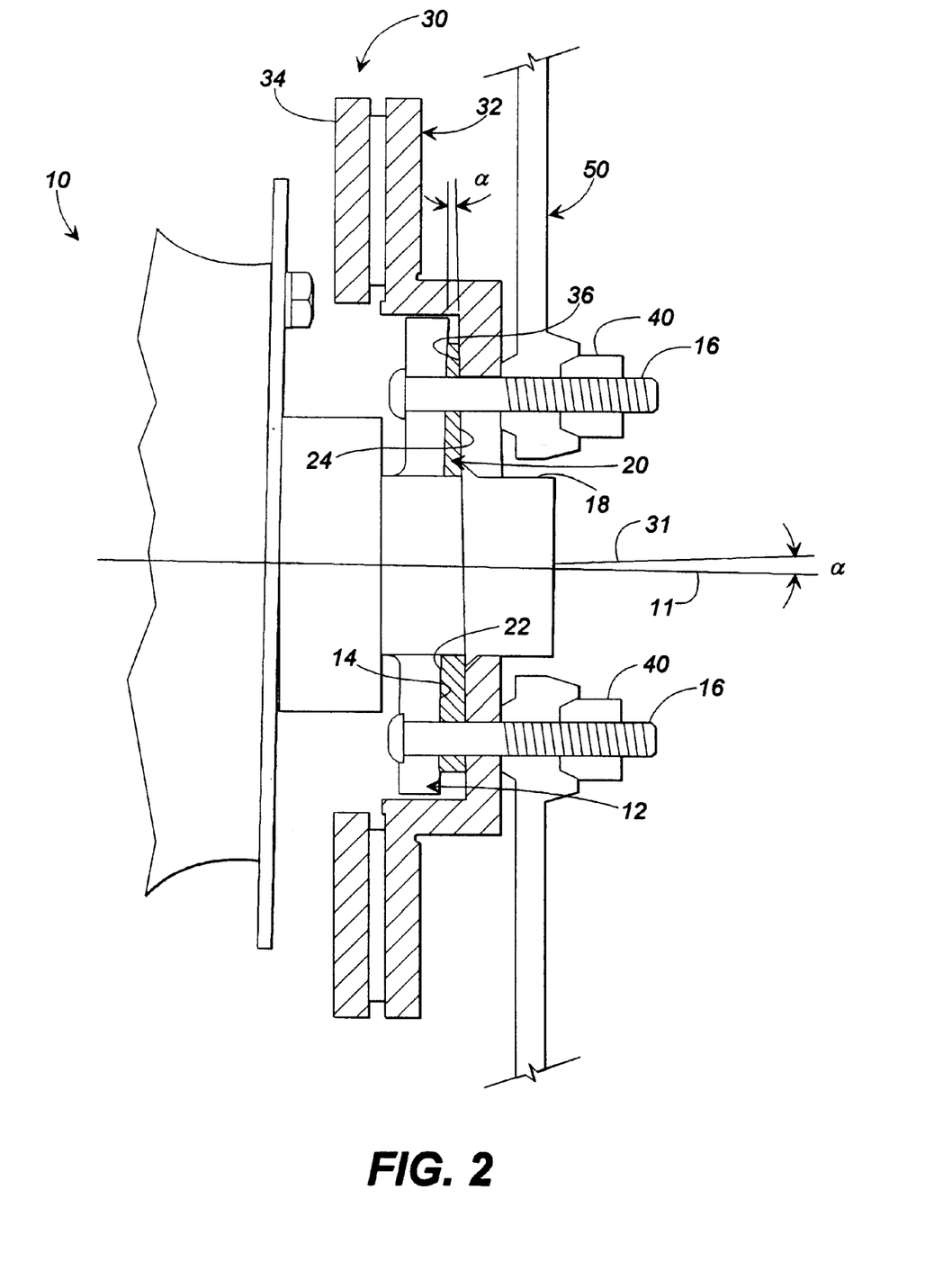
FIG. 2 is a cross-sectional schematic view of a correction plate according to the present invention interposed between the hub and rotor.

FIGS. 1 and 2 perhaps best depict the manner in which one embodiment of a correction plate according to the present invention is mounted between a hub assembly and a rotor. FIG. 1 is an exploded perspective view of a representative hub assembly 10 and disc brake rotor 30 in which a correction plate 20 according to the present invention is shown interposed between hub 12 and rotor 30. Correction plate 20 includes, for example, openings 26 adapted to correspond to existing rotor mounting hardware (e.g., lugs 16 and nuts 40) and opening 28 adapted to accommodate hub collar 18.

FIG. 2 is a cross-sectional schematic view of a correction plate 20 according to the present invention interposed between hub face 14 of hub 12 and rotor mating surface 36 of rotor 30. Nuts 40 secure wheel 50 to lugs 16, which pass through openings 26 in correction plate 20. Opening 28 in correction plate 20 accommodates hub collar 18. When installed as shown in FIG. 2, rotor surfaces 32 and 34 are precisely perpendicular to axis of rotation 11, which results in no runout of rotor 30. The diameter of correction plate 20 is shown to be slightly less than the diameter of hub 12 in order to eliminate possible deflection of correction plate 20 and make correction plate 20 compatible with the widest possible range of hubs exhibiting a particular lug pattern. Additionally, opening 28 is shown to be of greater diameter than hub collar 18 in order to allow clearance for the weld bead between hub collar 18 and opening 28, which may be irregularly shaped. Because correction plate surface 22 is located substantially in a single plane and correction plate surface 24 is located substantially in another single plane, the contact area between hub surface 14 and correction plate surface 22 and between correction plate surface 24 and rotor mating surface 36 are substantially the same as was the contact area between hub surface 14 and rotor mating surface 36 before installation of correction plate 20. Thus, installation of correction plate 20 does not result in undesirable stress concentration in any portion of these contact areas.

The correction of runout occurs because of angle α between substantially planar correction plate surfaces 22 and 24. As illustrated in FIG. 2, correction plate 20 corrects for the misalignment (also angle α) between axis 31, which may be perpendicular to rotor mating surface 36, and axis of rotation 11. While misalignment of rotor mating surface 36 with axis 31 is the cause of runout shown in FIG. 2, the other causes of runout discussed above (for example, hub face 14 not being perpendicular to axis of rotation 11) may also be present. However, all causes of runout may be corrected by the installation of correction plate 20, and FIG. 2 is not intended to limit the types of runout that may be corrected.

Figure 3:
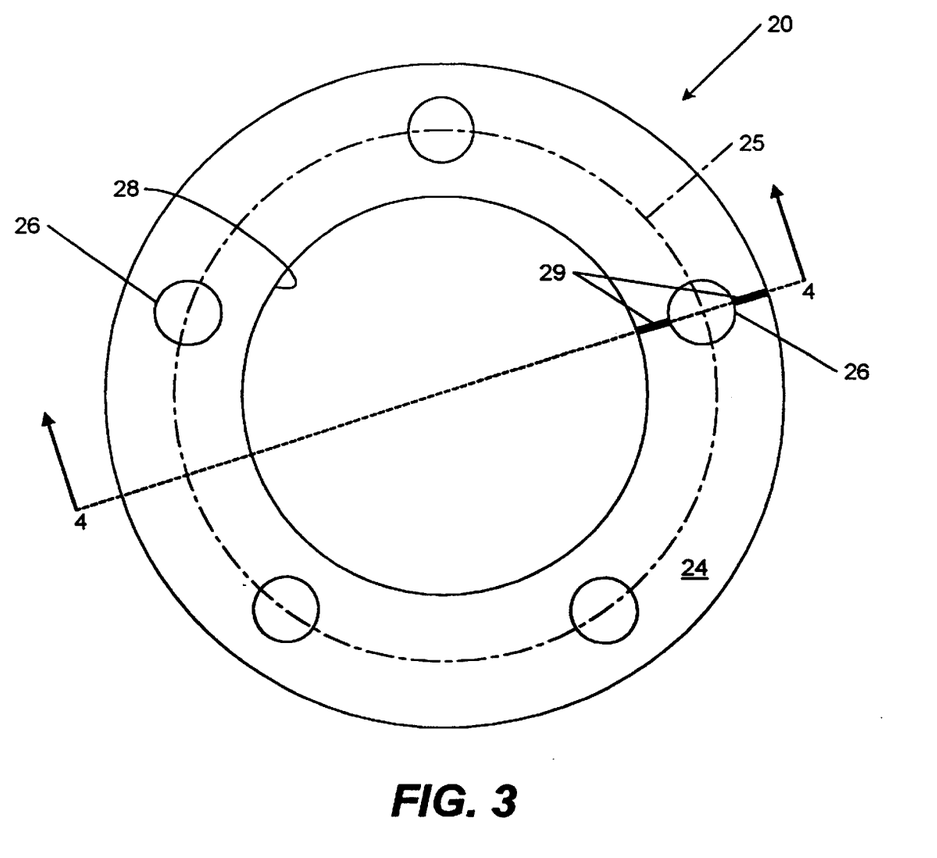
FIG. 3 is a plan view of one embodiment of a correction plate according to the present invention.
Figure 4:
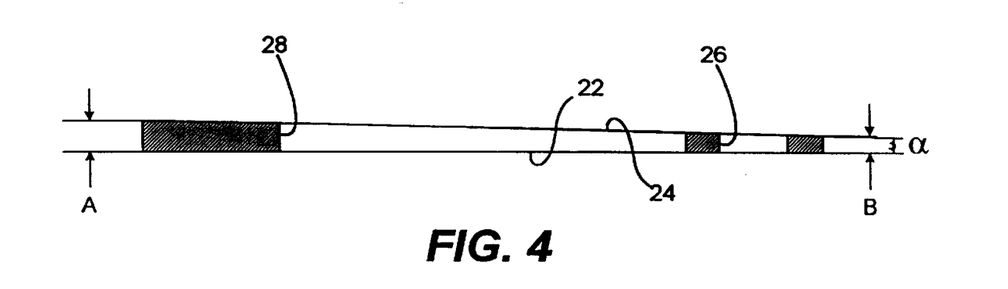
FIG. 4 is a cross-sectional view taken along line 4—4 of the correction plate shown in FIG. 3.

Correction plate 20, which is one embodiment of a correction plate according to the present invention, is best illustrated in FIGS. 3 and 4. As is best seen in FIG. 3, which is a plan view, correction plate 20 is a ring-shaped disc having five openings 26, which are circular holes, having centers uniformly and circumferentially spaced around lug circle 25. Openings 26 are positioned such that they correspond to a five-lug pattern for a particular make and model of automobile. Opening 28 is a centrally located circular opening in correction plate 20 adapted to accommodate hub collar 18 of the same automobile. Of course, variations in the geometry of openings 26 and 28 and the numbers of openings 26 appropriate for various automobiles are all within the scope of the invention. Indicator 29 marks the angular location on correction plate 20 having minimum thickness labeled "B" in FIG. 4).

Angle α is best seen in FIG. 4, which is a cross-sectional view taken along line 4—4 of FIG. 3. Angle α is related to the observed lateral runout according to the following equation:

$$\alpha = \arctan\left(\frac{R}{D_R/2}\right),$$

where R=measured lateral runout and
  $D_R$=diameter of the rotor at the location where runout was measured
Angle α as embodied in correction plate 20 and shown in FIG. 4 is also defined by the maximum thickness A and minimum thickness B of correction plate 20 according to the following equation:

$$\alpha = \arctan\left(\frac{A-B}{D_{CP}}\right),$$

where A=the maximum thickness of correction plate 20
  B=the minimum thickness of correction plate 20, and
  $D_{CP}$=the diameter of correction plate 20
Thus, substituting the right side of the first equation for α in the second equation allows one to determine the difference A−B according to the following equation:

$$A - B = \frac{2RD_{CP}}{D_R},$$

where A=the maximum thickness of correction plate 20
  B=the minimum thickness of correction plate 20,
  R=measured lateral runout
  $D_{CP}$=the diameter of correction plate 20, and
  $D_R$=the diameter of the rotor at the location where runout was measured Typical values for A and B are 0.020 inches and 0.018 inches respectively, and a typical range of values of $D_{CP}$ is 4.79 to 6.32 inches. Preferably, however, the technician would be provided with a table or devices that specify the appropriate correction plate for use with various values of measured runout for any particular make and model of automobile so that no calculations are required in order to choose the appropriate correction plate.

The table below summarizes results of testing using correction plates according to the present invention. Three automobiles, one from each of the three major American automobile manufacturers, were tested. The front rotors on both sides of each vehicle were checked for runout before machining on a bench mounted brake lathe, after machining on the brake lathe, and after machining with a correction plate in place. Each automobile exhibited runout on one front wheel rotor that was outside of the manufacturer's specifications. Thus, correction plates were installed on only one hub/rotor combination in each vehicle. "TIR" is an acronym for "total indicated reading," which is the value generated by the equipment used to measure lateral runout. "Ra" is the roughness average as measured by a surface roughness gauge having a stylus that travels across the peaks and valleys of the rotor surface.

| Make & Model | Manufacturer's Specification for Maximum Rotor Runout | Runout Before Machining | Runout After Machining w/o Correction Plate | Runout After Machining w/ Correction Plate | Rotor Surface Finish After Machining |
| --- | --- | --- | --- | --- | --- |
| '95 Pontiac Bonneville | 0.0030" TIR | 0.0048" TIR | 0.0055" TIR | 0.0005" | Ra 53 |
| '94 Lincoln Mark VIII | 0.0020" TIR | 0.0028" TIR | 0.0023" TIR | 0.0007" TIR | Ra 45 |
| '94 Chrysler Concord | 0.0030" TIR | 0.0032" TIR | 0.0032" TIR | 0.0011" TIR | Ra 49 |

All the prototype correction plates were manufactured to correct for approximately 0.0025" to 0.0030" runout at the rotor. More correction was needed on the Pontiac, so two correction plates were installed (but one correction plate of appropriate dimensions would have sufficed). The correction plate installed in the Lincoln over corrected for the runout (shifted the point of maximum runout 180°) but the corrected hub/rotor assembly was still well within the manufacturer's specifications. The final runout on the Chrysler was also well within manufacturer's specifications even though the correction plate installed in the Chrysler did not completely remove all observed runout. Initial driving tests with the correction plates installed in the vehicles resulted in superior braking performance with no perceptible brake pedal pulsation.

Figure 5:
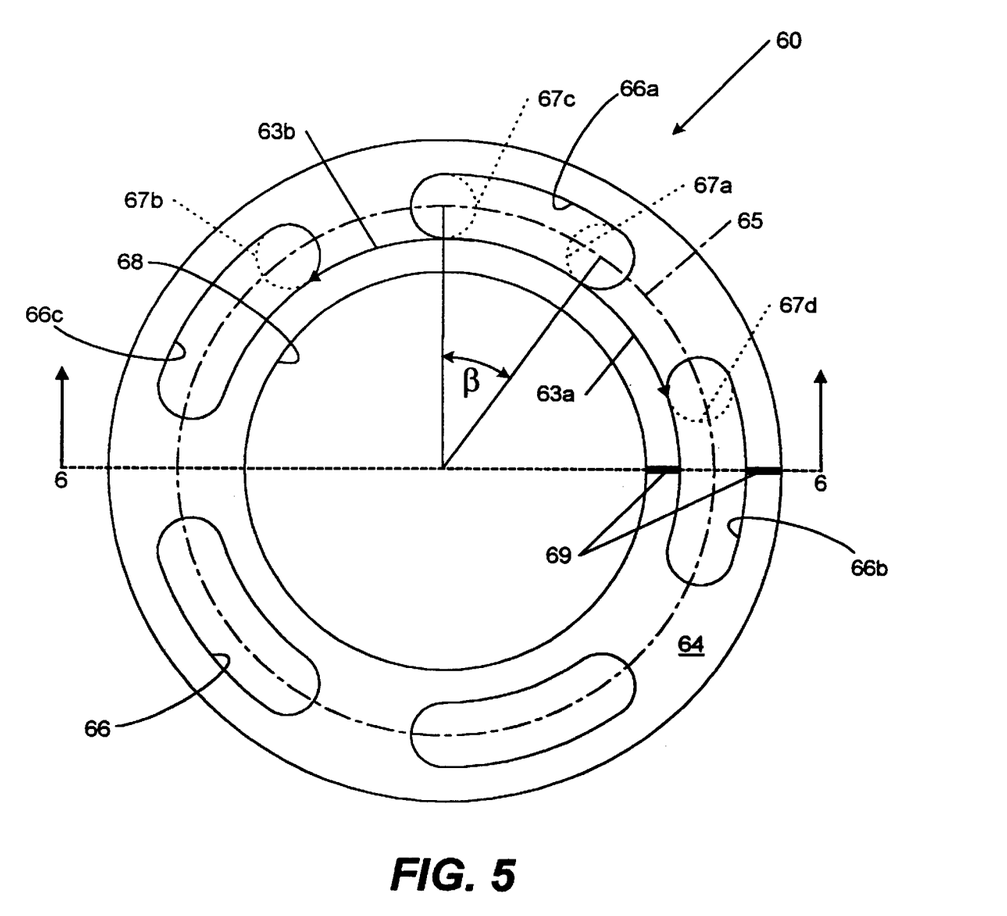
FIG. 5 is a plan view of an alternate embodiment of a correction plate according to the present invention.
Figure 6:
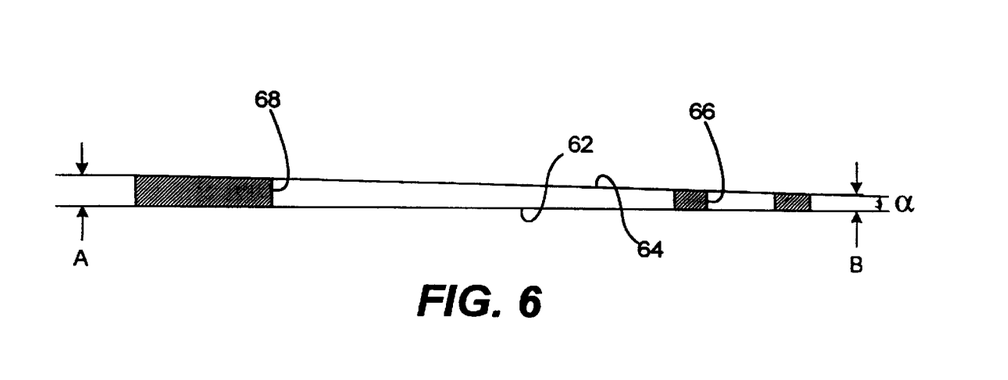
FIG. 6 is a cross-sectional view taken along line 6—6 of the correction plate shown in FIG. 5.

It has been found that correction plates according to the present invention provide excellent correction even though fixed holes mating with lugs do not allow precise alignment of the angular location of minimum thickness on the correction plate with the angular location of maximum runout on the hub and rotor. Such precise alignment can be accomplished, however, by using correction plate 60, which is an alternate embodiment of a correction plate according to the present invention and is illustrated in FIGS. 5 and 6. Correction plate 60 is very similar to correction plate 20 except that correction plate 60 incorporates slotted openings 66 rather than the circular openings 26 of correction plate 20. As is best seen in FIG. 5, which is a plan view, correction plate 60 is a ring-shaped disc having five slotted openings 66, which are circumferentially extending slots having semicircular ends and have radial centers that are uniformly and circumferentially spaced around lug circle 65. Slotted openings 66 shown in FIG. 5 are positioned such that they correspond to a five-lug pattern for a particular make and model of automobile. Opening 68 is a centrally located circular opening in correction plate 60 adapted to accommodate hub collar 18 of the same automobile.

Slotted openings 66 enable a technician to orient precisely the angular position of correction plate 60 corresponding to the minimum thickness B of correction plate 60 (as marked by indicator 69) in the correct angular relationship with hub 12 and rotor 30. As shown in FIG. 5, slot 66a (which is representative of all slotted openings 66) is defined by the angular translation of circle 67a through $\beta°$ of arc along lug circle 65 to the position shown as circle 67c. Once correction plate 60 is mounted on hub 12 with lugs 16 located at the circumferential center of slotted openings 66, the technician can rotate correction plate 60 by $\frac{1}{2}\beta°$ in either direction 63a or 63b. Thus, the maximum angular adjustment possible is $\beta°$.

Circles 67a–67d correspond to potential lug positions for some lugs 16 of a five lug pattern (and correspond exactly in shape to openings 26 of correction plate 20 as shown in FIG. 3). Rotating correction plate 60 in direction 63a by $\beta°$ from the starting position shown in FIG. 5 (assuming, for example, that two of lugs 16 are located at circles 67a and 67b and the remaining lugs 16 are located in similar relative positions) would result in slot 66a overlapping the starting location of slot 66b (at circle 67d). Similarly, rotating correction plate 60 in direction 63b by $\beta°$ (assuming a starting position for correction plate 60 such that two of lugs 16 are located at circles 67c and 67d and the remaining lugs 16 are located in similar relative positions) would result in slot 66a overlapping the starting location of slot 66c (at circle 67b). Thus, indicator 69, which marks the angular position on correction plate 60 having minimum thickness B, may be precisely aligned with the angular position on hub 12 and rotor 30 exhibiting the maximum lateral runout. The minimum angle $\beta_{min}$ to enable such full adjustment of the angular orientation of correction plate 60 to hub 12 and rotor 30, may be calculated using the following equation:

$$\beta_{min} = \left(\frac{360}{2N}\right),$$

where N=number of lugs

The theoretical maximum $\beta_{max}$ through which slotted openings 66 may sweep is exactly $2\beta_{min}$. However, $\beta$ must always be less than $\beta_{max}$ so that slotted openings 66 do not overlap (the exact value of $\beta_{max}$ is determined by the diameter of circles 67a–67d). For correction plate 60 as shown in FIG. 5, which is adapted to correspond to a five-lug pattern, $\beta_{min}=36°$, $\beta_{max}\approx72°$, and thus $36°\leq\beta<\approx72°$ (to enable precise angular orientation of correction plate 60). For a correction plate adapted to correspond to a four-lug pattern, $\beta_{min}=45°$, $\beta_{max}\approx90°$, and thus $45°\leq\beta<\approx90°$.

Of course, just as with correction plate 20 shown in FIG. 4, variations in the geometry of slotted openings 66 and opening 68 and the numbers of slotted openings 66 appropriate for various automobiles are all within the scope of the invention. Angle $\alpha$ is best seen in FIG. 6, which is a cross-sectional view taken along line 6—6 in FIG. 5 and is calculated using the same equations based on lateral runout and maximum thickness A and minimum thickness B discussed in connection with angle $\alpha$ shown in FIG. 4.

Figure 7:
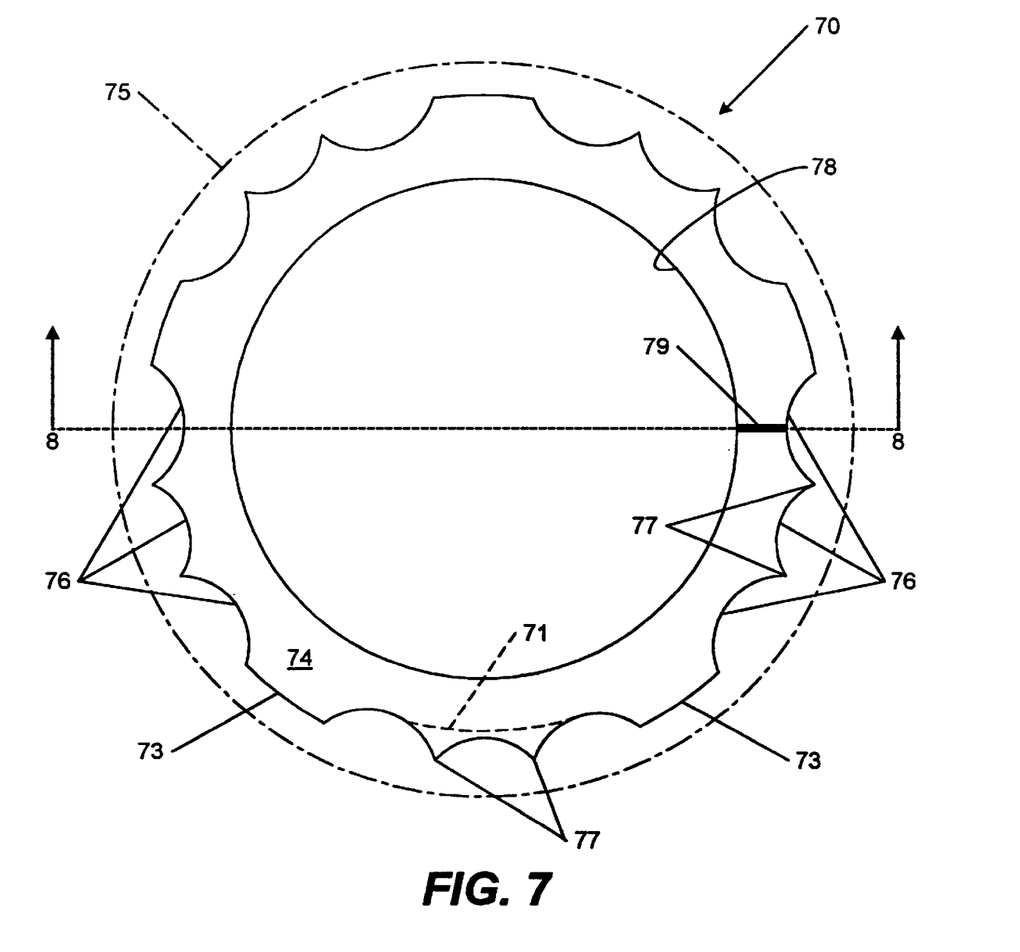
FIG. 7 is a plan view of second alternate embodiment of a correction plate according to the present invention.
Figure 8:
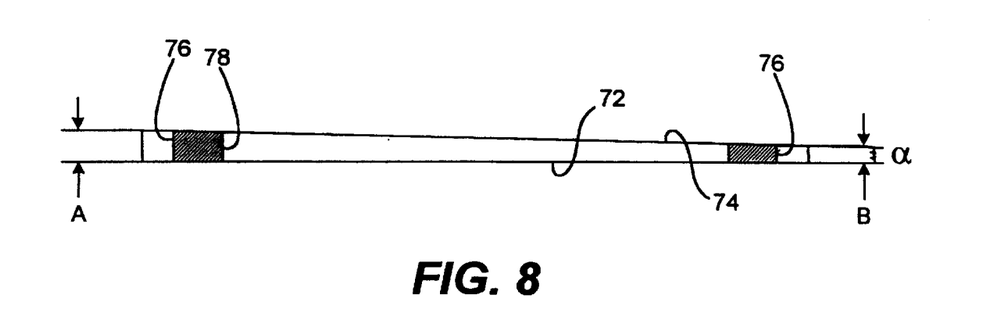
FIG. 8 is a cross-sectional view taken along line 8—8 of the correction plate shown in FIG. 7.

Correction plate 70, which is a second alternate embodiment of a correction plate according to the present invention, is illustrated in FIGS. 7 and 8. Correction plate 70 is also similar to correction plate 20 except that correction plate 70 incorporates indentations 76 defined by projections 77 around the outer perimeter of correction plate 70 rather than the circular openings 26 of correction plate 20. As is best seen in FIG. 7, which is a plan view, correction plate 70 is a ring-shaped disc having fifteen indentations 76, which are circumferentially spaced in groups of three around the outer perimeter of correction plate 70. Each group of indentations 76 is separated by a separator 73. The centers of the arcs that define indentations 76 are circumferentially spaced around lug circle 75. Indentations 76 shown in FIG. 7 are positioned such that they correspond to a five-lug pattern for a particular make and model of automobile. Opening 78 is a centrally located circular opening in correction plate 70 adapted to accommodate hub collar 18 of the same automobile.

Indentations 76 enable a technician to align indicator 79, which marks the angular position on correction plate 70 having the minimum thickness B, with the angular positions on the hub 12 and rotor 30 corresponding to the maximum runout. The projections 77 that define individual indentations also define specific angular orientations in which correction plate 70 may be placed with respect to hub 12 and rotor 30. Projections 77 also would prevent correction plate 70 from easily spinning relative to hub 12 and rotor 30 once correction plate 70 is installed. Thus, correction plate 70 is configured to allow for a finer degree of angular alignment between correction plate 70 and hub 12 and rotor 30 than does correction plate 20 while retaining the positive angular positioning of correction plate 20 between hub 12 and rotor 30.

In general, the greater the number of projections 77 (and thus indentations 76), which are arranged between separators 73, the more precisely the angular orientation of correction plate 70 to hub 12 and rotor 30 may be adjusted but the lower the resistance of correction plate 70 to unintentional angular shifting after installation. As the number of indentations in each group increases, projections 77 would grow smaller and indentations 76 would resemble the inner radial half of slotted openings 66 of FIG. 5 (the half located closest to the center of correction plate 70). Dashed line 71 is the arc into which projections 77 would disappear to form such a "half slot." These "half-slots" would also enable the technician to adjust, with the same precision available when using correction plate 60, the angular orientation of correction plate 70 with respect to hub 12 and rotor 30. The minimum angular width between projections 73 to enable full angular adjustment of correction plate 70 is defined by the same equation for calculating $\beta$ which is discussed in connection with slotted openings 66 shown in FIG. 5.

Correction plate 70, because it includes open ended indentations 76 rather than circular openings 26 of correction plate 20 or slotted openings 66 of correction plate 60, conceivably could enable the technician to install correction plate 70 between the hub and rotor without completely removing rotor 30 from hub 12. For example, the technician would remove three adjacent nuts 40 of five nuts 40 from lugs 16 in order to be able to slide correction plate 70 into place. Correction plate 70, while not providing the infinite angular adjustment of correction plate 60 or correction plate 70 with "half slots," may be particularly useful for situations in which rotor surfaces 32 and 34 do not require resurfacing but runout which requires correction is present.

Of course, just as with correction plate 20 shown in FIG. 4, variations in the geometry of indentations 76 and opening 78 and the numbers of separators 73, projections 77, and indentations 76 appropriate for various automobiles are all within the scope of the invention. Angle α is best seen in FIG. 8, which is a cross-sectional view taken along line 8—8 and is calculated using the same equations based on lateral runout and maximum thickness A and minimum thickness B discussed in connection with angles a shown in FIGS. 4 and 6.

Figure 9:
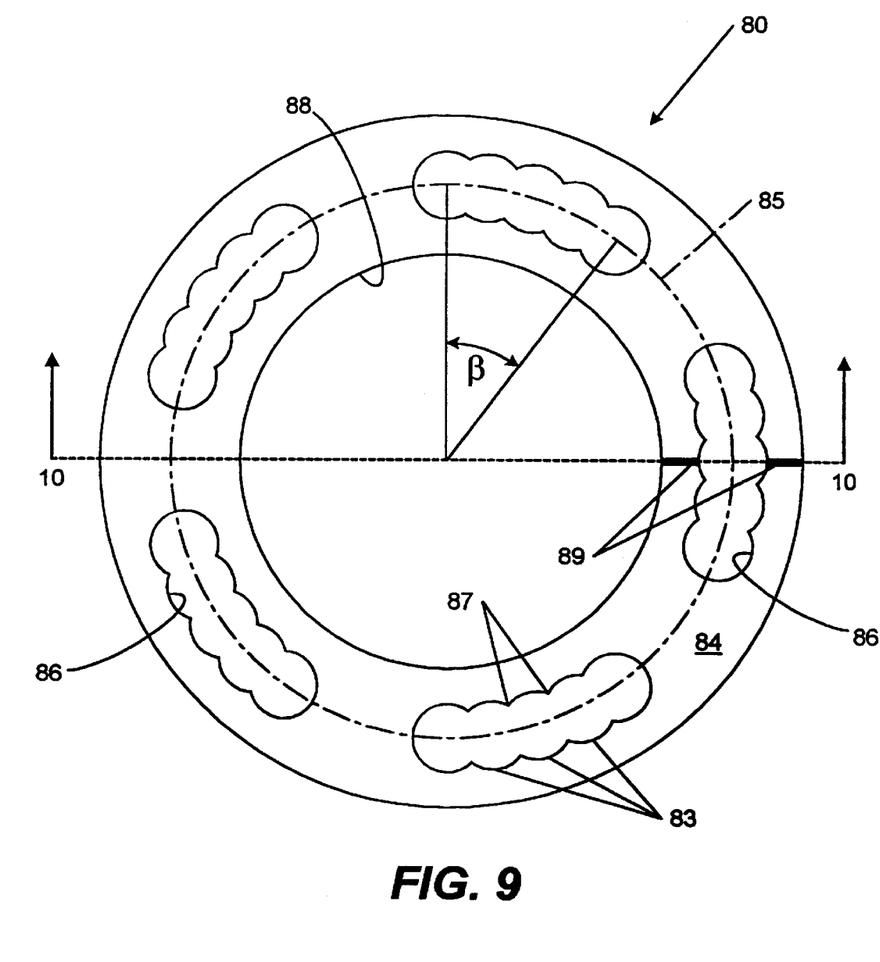
FIG. 9 is a plan view of a third alternate embodiment of a correction plate according to the present invention.
Figure 10:
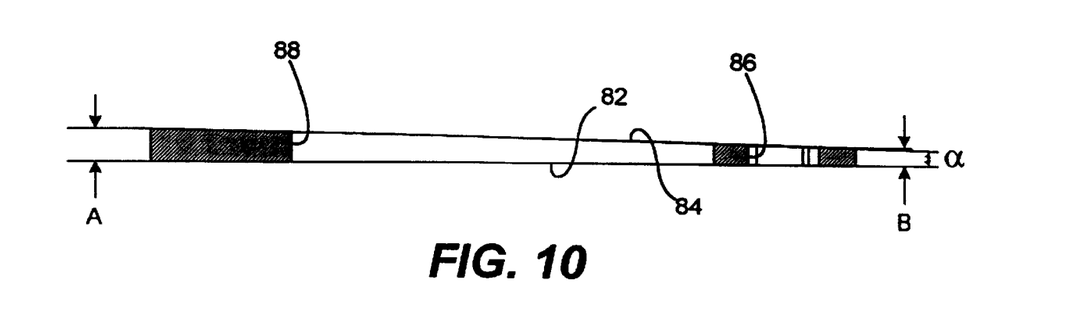
FIG. 10 is a cross-sectional view taken along line 10—10 of the correction plate shown in FIG. 9.

Correction plate 80, which is a third alternate embodiment of a correction plate according to the present invention, is illustrated in FIGS. 9 and 10. Correction plate 80 is similar to correction plate 60 except that correction plate 80 incorporates five indentations 83 defined by four projections 87 within each of five slotted openings 86 rather than the smooth slotted openings 66 of correction plate 60. As is best seen in FIG. 9, which is a plan view, correction plate 80 is a ring-shaped disc having five indentations 83, which are circumferentially spaced within each of slotted openings 86. The centers of the arcs that define indentations 83 are circumferentially spaced around lug circle 85. Indentations 83 shown in FIG. 9 are positioned such that indentations that are similarly positioned within each of the five slotted openings 86 correspond to a five-lug pattern for a particular make and model of automobile. Opening 88 is a centrally located circular opening in correction plate 80 adapted to accommodate hub collar 18 of the same automobile.

Indentations 83 enable a technician to align indicator 89, which marks the angular position on correction plate 80 having the minimum thickness B, with the angular positions on the hub 12 and rotor 30 corresponding to the maximum runout. Projections 87 also would prevent correction plate 80 from easily spinning relative to hub 12 and rotor 30 once correction plate 80 is installed. Thus, correction plate 80 is configured to allow for a finer degree of angular alignment with hub 12 and rotor 30 than does correction plate 20 while retaining the positive angular positioning of correction plate 20 between hub 12 and rotor 30.

In general, the greater the number of projections 87 (and thus indentations 83), which are arranged within each slotted opening 86, the more precisely the angular orientation of correction plate 80 to hub 12 and rotor 30 may be adjusted and the lower the resistance of correction plate 80 to unintentional angular shifting after installation. The minimum and maximum angular widths of slotted openings 86 are defined by the same equations for calculating $\beta_{min}$ and $\beta_{max}$ which are discussed in connection with slotted openings 66 shown in FIG. 5.

Of course, just as with correction plate 70 shown in FIG. 7, variations in the geometry of indentations 83 and opening 88 and the numbers of slotted openings 86 appropriate for various automobiles are all within the scope of the invention. Angle α is best seen in FIG. 10, which is a cross-sectional view taken along line 10—10 and is calculated using the same equations based on lateral runout and maximum thickness A and minimum thickness B discussed in connection with angles α shown in FIGS. 4, 6, and 8.

Figure 11:
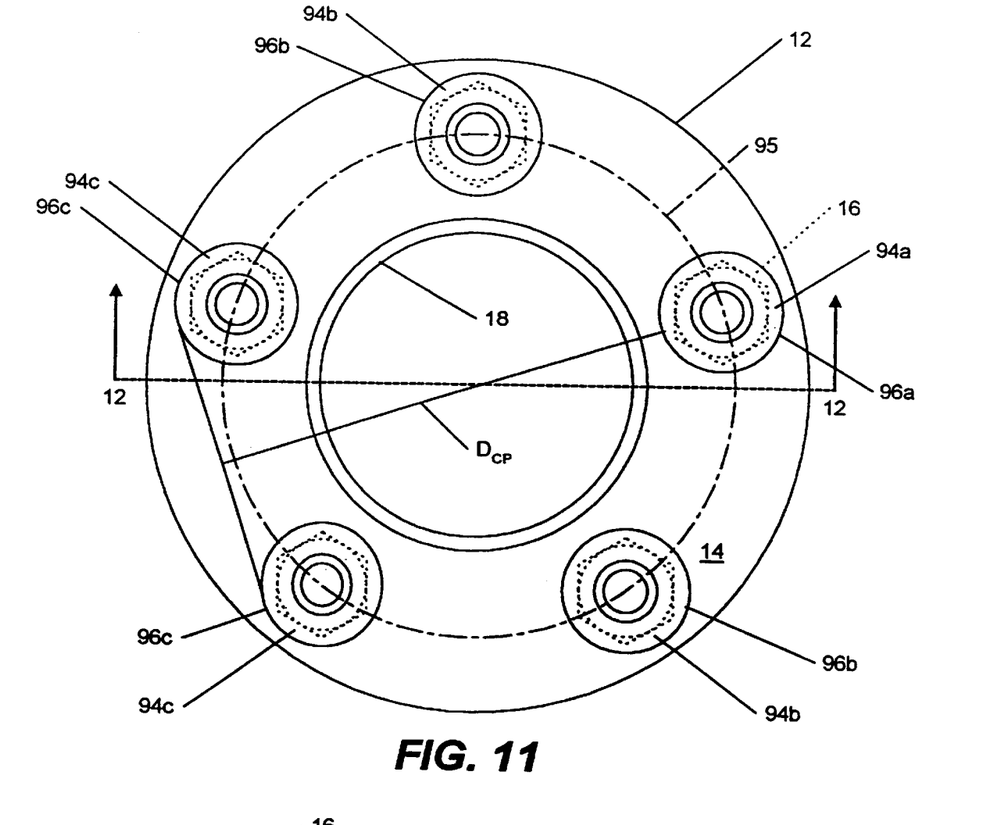
FIG. 11 is a plan view of a fourth alternate embodiment of a correction plate according to the present invention comprising washers of varying thicknesses installed on lugs protruding from a hub.
Figure 12:
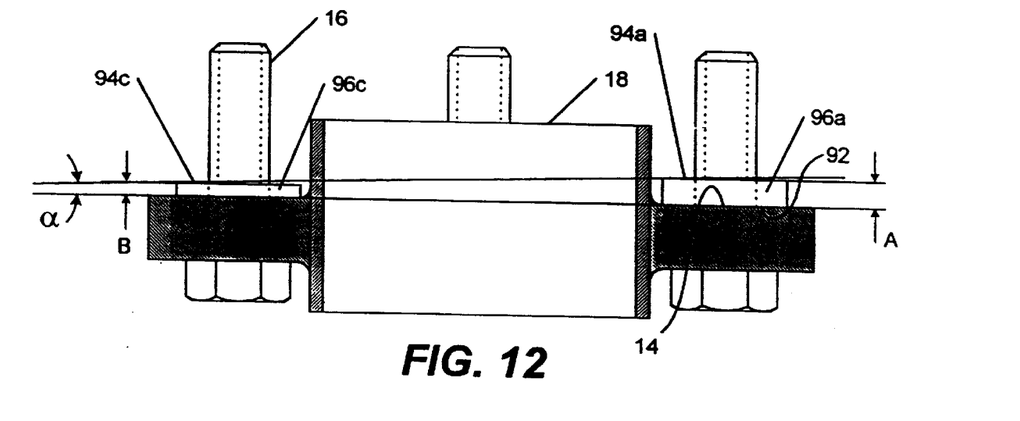
FIG. 12 is a cross-sectional view of the hub and washers shown in FIG. 11 taken along line 12—12 of FIG. 11.

FIGS. 11 and 12 illustrate a fourth alternate embodiment of a correction plate according to the present invention comprising at least one washer installed on a lug 16 of hub 12. The particular arrangement shown in FIG. 11 consists of five washers of varying thicknesses labeled 96a, 96b, and 96c installed on lugs 16 of hub 12 such that they rest on mating surface 14 of hub 12. As is best seen in FIG. 12, washer 96a is of maximum thickness A and washers 96c are of minimum thickness B. Washers 96b are of an intermediate thickness appropriately aligned with the plane defined by washers 96a and 96c, which plane defines an angle α with another plane 92 defined by the lower surfaces of washers 96a–96c. Angle α is calculated according to a similar relationship as is used to calculate angle α shown in FIGS. 4, 6, and 8; the only difference being that $D_{CP}$ is defined as shown in FIG. 11, the distance (along a diameter of hub 12) between the portions of the upper surfaces 94a and 94c of washers 96a and 96c respectively that would contact the rotor mating surface rather than the diameter of the correction plate.

While five washers are shown in FIGS. 11 and 12, as few as one washer may be employed to correct runout according to the present invention. When two washers are used, they may be of the same thickness or of different thicknesses depending on which lugs they are installed. However, if three or more washers are installed on the lugs, then the thickness of at least one washer must be different from the thickness of the remaining washers.

Correction plates 20, 60, 70, 80, and 90 may be installed between hub 12 and rotor 30 as shown in FIG. 2 as follows. The brake technician removes the wheel and turns the rotor while a stationary stylus that is attached to a micrometer rides atop the surface of the rotor. The technician notes the maximum lateral runout of the brake rotor as measured by the micrometer and the distance from the center of the rotor to the stylus of the micrometer. The technician also marks the angular position on the rotor and hub corresponding to the maximum runout. The technician removes the brake rotor from the hub and resurfaces the rotor on a bench lathe. After resurfacing is completed, the technician chooses an appropriately tapered correction plate to compensate for the recorded maximum lateral runout. The technician mounts the correction plate on the hub with its point of minimum thickness positioned adjacent the position on the hub at which maximum lateral runout was observed and marked. Once the correction plate is appropriately positioned on the hub, the technician remounts the brake rotor to the hub in the same orientation in which the rotor was previously mounted.

While certain embodiments of the present invention have been described above, these descriptions are given for purposes of illustration and explanation. Variations, changes, modifications and departures from the devices and methods disclosed above may be adopted without departure from the scope or spirit of the present invention which, in sum, employs any type of correction plate that enables the technician to change the angle between the hub surface and the rotor mating surface by interposing material having tapered thickness between the hub and rotor.

I claim:

1. A correction plate assembly for correcting runout in vehicular braking systems, comprising:
   a. a hub;
   b. a disc brake rotor; and
   c. at least one correction plate for alleviating runout of the disc brake rotor by introducing an angle between a face of the hub and a face of the rotor, comprising:
      i. a first substantially planar substantially annular surface,
      ii. a second substantially planar substantially annular surface oriented substantially non-parallel to the first surface, iii. a first location featuring a minimum distance between the first surface and the second surface, and iv. a second location featuring a maximum distance between the first surface and the second surface greater than the minimum distance between the first surface and the second surface, which correction plate is interposed between the hub and disc brake rotor in a substantially fixed angular orientation such that the first location on the correction plate is approximately aligned with a third location on the combination of the hub and the disc brake rotor to reduce the runout.

2. The combination of claim 1, in which said at least one correction plate further comprises a plurality of circumferentially spaced apart openings spanning the first surface and the second surface and adapted to correspond to existing mounting hardware for the disc brake rotor.

3. The combination of claim 2, in which the plurality of circumferentially spaced apart openings are circumferentially extending slots.

4. The combination of claim 3, in which a number of lugs for mounting the disc brake rotor to the hub defines an angle β through which the circumferentially extending slots extend such that β measured in degrees is defined by the following relationship: $360/(2*N) \leq \beta < 360/N$, where N is the number of lugs in the bolt pattern.

5. The combination of claim 2, in which said at least one correction plate further comprises a disc defining an outer perimeter and on the outer perimeter a plurality of projections that define a plurality of indentations adapted to correspond to existing mounting hardware of the disc brake rotor.

6. The combination of claim 5, in which the outer perimeter further comprises a plurality of separators that define a plurality of groups of indentations adapted to correspond to existing mounting hardware of the disc brake rotor.

7. The combination of claim 2, in which the plurality of circumferentially spaced apart openings are circular.

8. The combination of claim 2, in which said at least one correction plate further comprises a disc defining an outer perimeter and a plurality of separators that define a plurality of half slots adapted to correspond to existing mounting hardware of the disc brake rotor.

9. The assembly of claim 1 further comprising at least one additional correction plate.

10. A method of correcting lateral runout of a disc brake rotor mounted on a hub of a wheel assembly, comprising the steps of:

a. determining an angular position on the disc brake rotor and the hub corresponding to a maximum lateral runout;

b. measuring the maximum lateral runout;

c. selecting a correction plate for the hub and disc brake rotor combination that is adapted to compensate for the maximum lateral runout by introducing an angle between a face of the hub and a face of the rotor, which correction plate comprises:

i. a first substantially planar substantially annular surface, ii. a second substantially planar substantially annular surface oriented substantially non-parallel to the first surface, iii. a first location exhibiting a minimum distance between the first surface and the second surface, and iv. a second location exhibiting a maximum distance between the first surface and the second surface greater than the minimum distance between the first surface and the second surface; and d. interposing the correction plate between the hub and the disc brake rotor in a substantially fixed angular orientation relative to the hub and disc brake rotor that is adapted to compensate for the maximum lateral runout.

11. The method of claim 10, in which the correction plate further comprises a plurality of circumferentially spaced apart openings through the correction plate adapted to mate with existing mounting hardware for the disc brake rotor.

12. The method of claim 11, in which the plurality of circumferentially spaced apart openings are circumferentially extending slots.

13. The method of claim 12, in which a number of lugs for mounting the disc brake rotor to the hub defines an angle β through which the circumferentially extending slots extend such that β measured in degrees is defined by the following relationship: $360/(2*N) \leq \beta < 360/N$, where N is the number of lugs in the bolt pattern.

14. The method of claim 11, in which the correction plate is a disc defining an outer perimeter and further comprises on the outer perimeter a plurality of projections that define a plurality of indentations adapted to correspond to existing mounting hardware of the disc brake rotor.

15. The method of claim 14, in which the outer perimeter further comprises a plurality of separators that define a plurality of groups of indentations adapted to correspond to existing mounting hardware of the disc brake rotor.

16. The method of claim 11, in which the correction plate is a disc defining an outer perimeter and further comprises a plurality of separators that define a plurality of half slots adapted to correspond to existing mounting hardware of the disc brake rotor.

17. The method of claim 11, in which the correction plate is arc-shaped.

18. The method of claim 11, in which the plurality of circumferentially spaced apart openings are circular.

19. A correction plate assembly for correcting runout between a rotor and a hub by introducing a correction angle between a face of the hub and a face of the rotor, comprising:

a. a hub;

b. a rotor;

c. at least one correction plate for correcting runout of the rotor, comprising:

i. a first surface defining a first plane;

ii. a second surface defining a second plane oriented substantially non-parallel to the first plane;

iii. a correction plate angle defined by the first and second planes that is greater than zero degrees; and iv. a plurality of circumferentially spaced apart openings spanning the first and second surfaces of the disc and adapted to correspond to hardware for mounting the disc brake rotor to the hub, which correction plate is interposed between the hub and the rotor in a substantially fixed angular orientation relative to the hub and rotor.

20. The assembly of claim 19, in which the plurality of circumferentially spaced apart openings are circumferentially extending slots.

21. The assembly of claim 19, in which a number of lugs for mounting the disc brake rotor to the hub defines an angle β through which the circumferentially extending slots extend such that β measured in degrees is defined by the following relationship: $360/(2*N) \leq \beta < 360/N$, where N is the number of lugs in the bolt pattern.

22. The assembly of claim 19, in which the plurality of circumferentially spaced apart openings are circular.

23. A correction plate assembly for correcting brake runout, comprising:
   a. a hub;
   b. a rotor; and
   c. correction means for correcting runout of the rotor relative to the hub by introducing a correction angle between a face of the hub and a face of the rotor, comprising at least a first and second surface means substantially fixed in position between the rotor and the hub for altering orientation of the rotor relative to the hub, the first surface means contacting a face of the hub, the second surface means contacting a face of the rotor, the first surface means and the second surface means causing said faces of the hub and rotor to be oriented substantially non-parallel to each other.

24. The assembly of claim 23, in which a plurality of openings connects the first and second surface means, each opening adapted to receive a lug bolt of the hub.

25. The assembly of claim 23, in which the first and second surface means are substantially planar surfaces on opposite sides of a ring.

26. The assembly of claim 23, wherein said correction means further comprises a plurality of rings, each having a first and second surface means.

* * * * *

UNITED STATES PATENT AND TRADEMARK OFFICE
CERTIFICATE OF CORRECTION

PATENT NO. :      5,918,707
DATED      :      July 6, 1999
INVENTOR(S) :     Thomas N. Saunders, III et al It is certified that error appears in the above-indentified patent and that said Letters Patent is hereby corrected as shown below:

Column 5, line 9, delete "a" and insert --α--

Column 5, line 65, delete "a" and insert --α--

Column 9, line 16, delete "a" and insert --α--

Signed and Sealed this

Eighteenth Day of April, 2000

Attest:

Q. TODD DICKINSON

*Attesting Officer*        *Director of Patents and Trademarks*